P. AHLHEIM.
BAKE OVEN.
APPLICATION FILED MAR. 13, 1907.
911,799.
Patented Feb. 9, 1909.
4 SHEETS—SHEET 1.
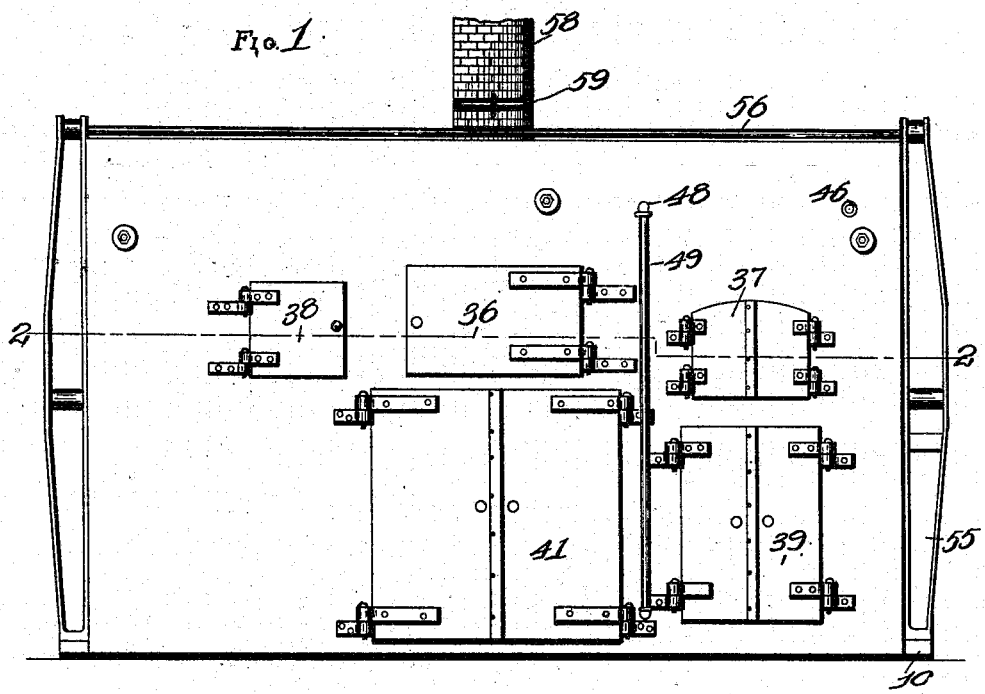
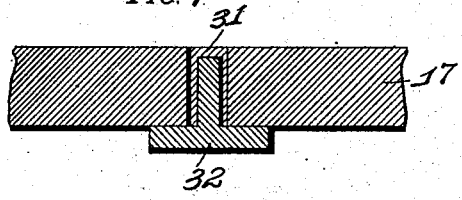
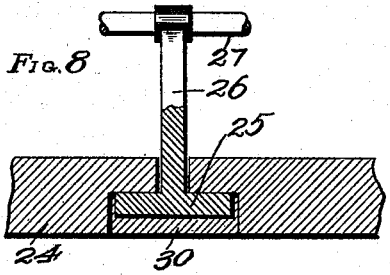
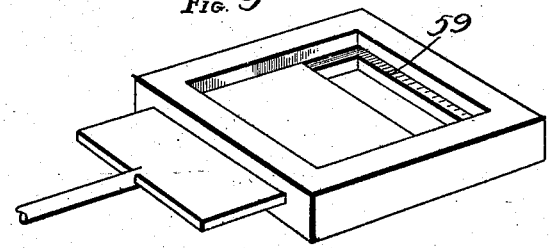
WITNESSES
INVENTOR
Peter Ahlheim
by Hopkins & Ericks attys P. AHLHEIM.
BAKE OVEN.
APPLICATION FILED MAR. 13, 1907.
911,799.
Patented Feb. 9, 1909.
4 SHEETS—SHEET 2.
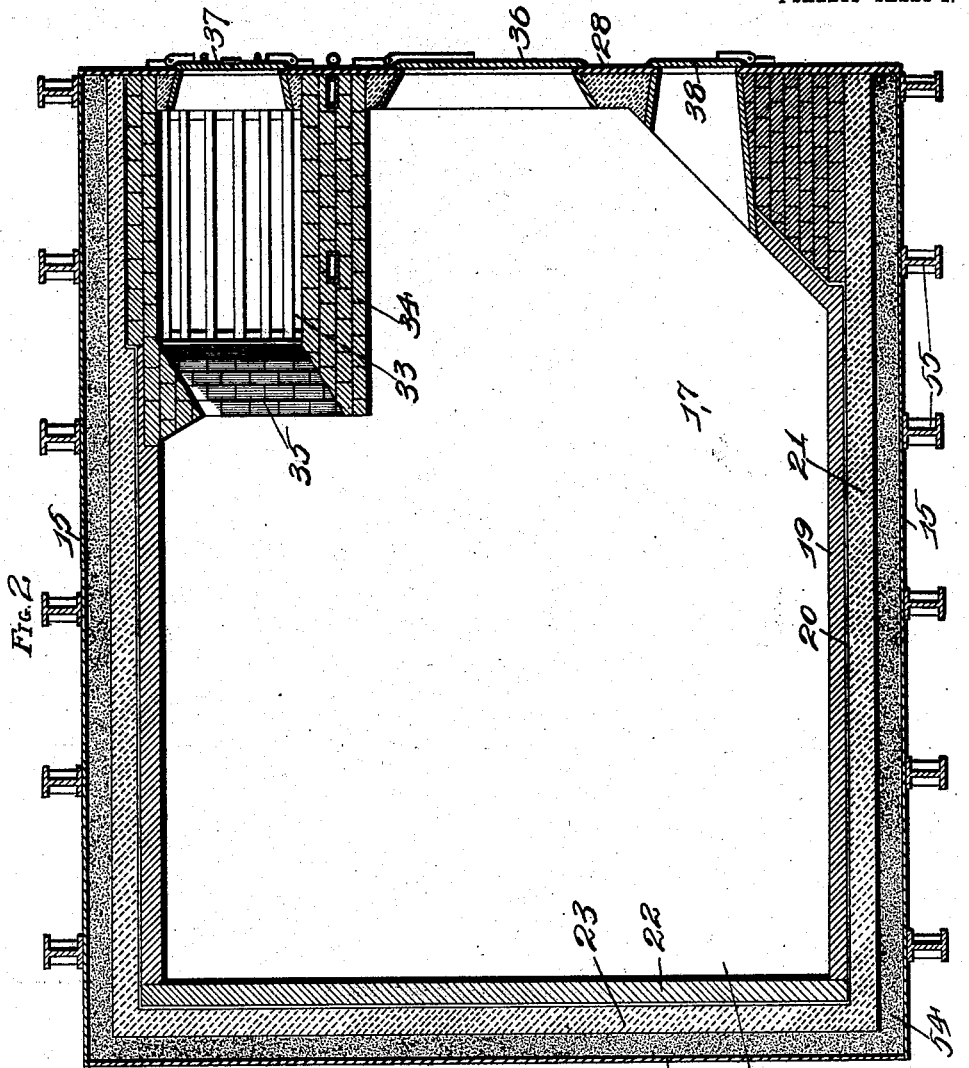
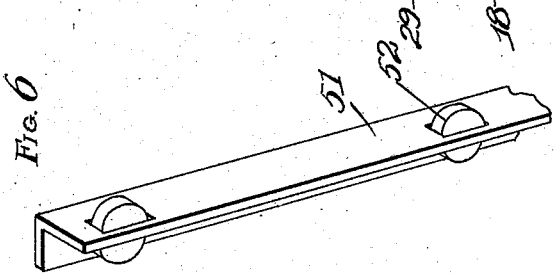
WITNESSES
INVENTOR
Peter Ahlheim
by Hopkins & Ewing attys P. AHLHEIM.
BAKE OVEN.
APPLICATION FILED MAR. 13, 1907.
911,799.
Patented Feb. 9, 1909.
4 SHEETS—SHEET 3.
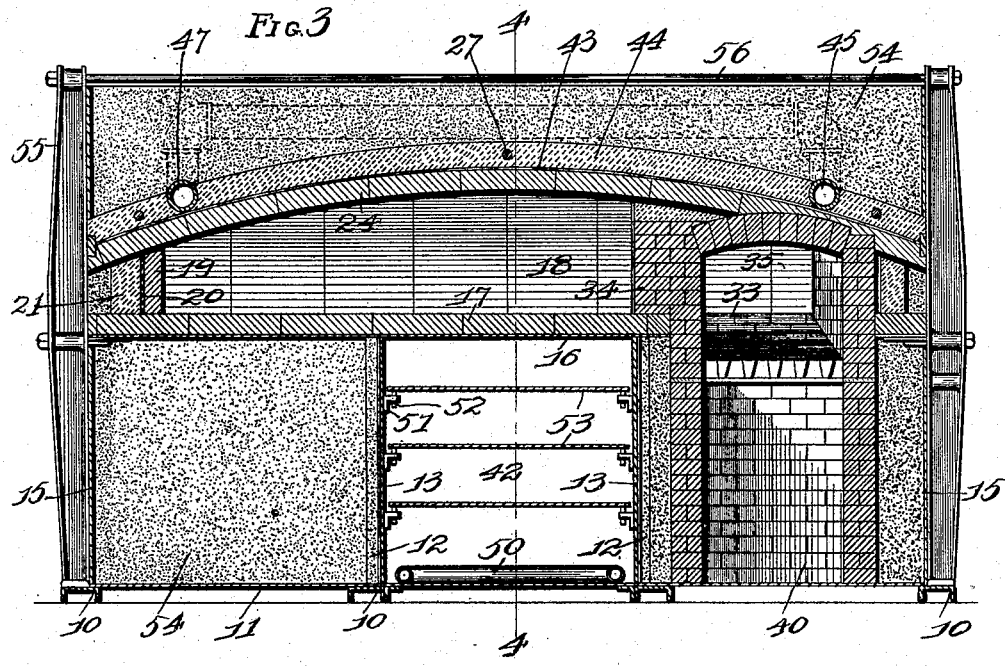
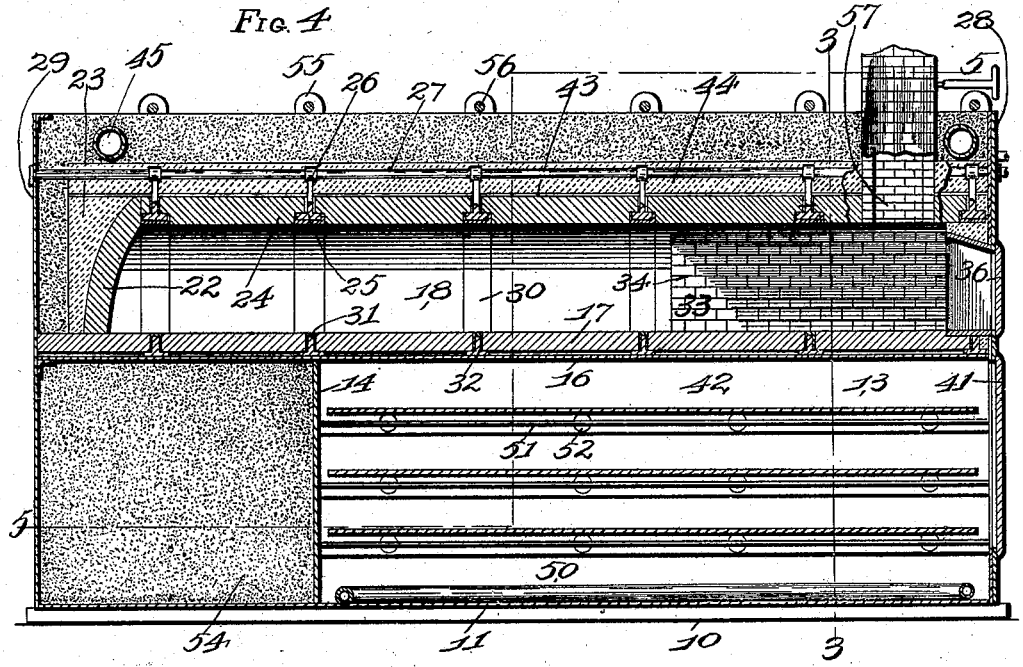
WITNESSES
INVENTOR
Peter Ahlheim
by Hopkins & Ewing attys.

P. AHLHEIM.
BAKE OVEN.
APPLICATION FILED MAR. 13, 1907.
911,799.
Patented Feb. 9, 1909.
4 SHEETS—SHEET 4.
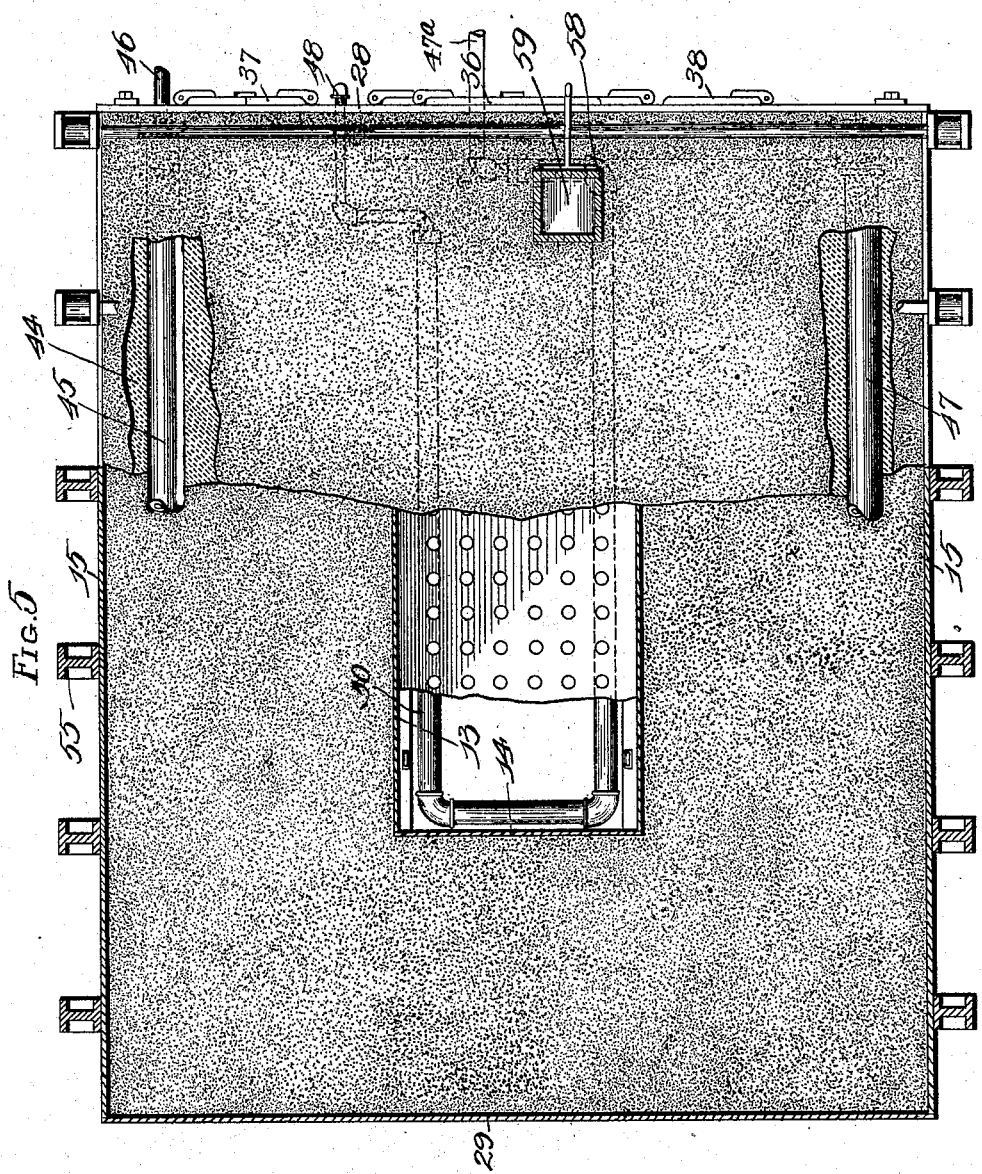
WITNESSES
INVENTOR
Peter Ahlheim
by Hopkins & Ericks atty's

UNITED STATES PATENT OFFICE.

PETER AHLHEIM, OF ST. LOUIS, MISSOURI.

BAKE-OVEN.

No. 911,799.　　　Specification of Letters Patent.　　　Patented Feb. 9, 1909.

Application filed March 13, 1907. Serial No. 362,212.

*To all whom it may concern:*

Be it known that I, PETER AHLHEIM, a citizen of the United States, residing in the city of St. Louis and State of Missouri, have invented a new and useful Portable Bake-Oven, of which the following is a specification.

This invention relates to improvements in bakers' ovens, and consists in the novel arrangement, construction and combination of parts as will be fully hereinafter described and claimed.

The object of my invention is to construct a baker's oven having a baking compartment in which is located a fire-box whereby the oven is heated, and after being sufficiently heated, the fire is removed from the fire-box and beneath the baking compartment is located a heated compartment in which is placed the bread or confections, after being properly formed so as to raise the dough before placing it into the baking compartment.

A further object of my invention is to form a baking compartment, beneath it a heated compartment and a pipe connection embedded in the material above the baking compartment and communication with the heated compartment for supplying sufficient heat to the heated compartment.

A further object of my invention is to construct a baker's oven in portable form made of a metallic frame by which is supported tiling for forming compartments and retaining the heat in the compartments, and sand and concrete is placed over the tiling to assist in retaining the heat in said compartments.

In the drawings: Figure 1 is a front elevation of my improved baking oven. Fig. 2 is a horizontal sectional view taken on the line 2—2 of Fig. 1. Fig. 3 is a cross sectional view taken on the line 3—3 of Fig. 4. Fig. 4 is a vertical central sectional view taken on the line 4—4 of Fig. 3. Fig. 5 is a combination plan and horizontal sectional view taken on the line 5—5 of Fig. 4. Fig. 6 is a detail perspective view of one of the angle supports located in the heated compartment. Figs. 7 and 8 are enlarged detail sectional views of a portion of the tiling together with the angles for supporting the same. Fig. 9 is a detail perspective view of the damper used in the flue.

In the construction of my invention I provide a plurality of channel bars 10, which form the base supports for the structure, and on the same is placed a metallic plate 11. Upon the two center channels is mounted a plurality of angle bars 12, and to the same is securely fastened a metallic plate 13. This structure extends rearwardly a sufficient distance and is provided with a rear wall or plate 14. Upon the two side channel bars 10 I place a plate 15 extending the entire depth of the oven, and upon the top of the plates 13 and 15 and extending across the entire width and length of the oven is a cover plate 16. Upon the cover plate 16 I place a floor of tiling 17, which acts as the bottom for the baking compartment 18. Upon each side of the floor 17 I provide a wall of tiling 19, and on the rear side thereof I place a sheet of asbestos 20, and against the asbestos a layer of concrete 21. At the rear of the baking compartment I provide a wall 22 composed of tiling and suitably curved so as to deflect the heat to properly circulate around the entire baking compartment and against the rear of the wall 22 I apply concrete 23. Upon the side walls I construct an arch 24 which forms the top of the baking compartment and it consists of tiling supported by arched T bars 25 provided with upwardly projecting arms 26, also provided with openings through which rods 27 are passed for supporting the arched T bars in proper position. The ends of the rods 27 are supported in the front wall 28 and the rear wall 29—see Fig. 4.

To provide a smooth and even appearance to the inner surface of the baking compartment, I fill the joining spaces between the tiles occupied by the arched T bars with fire clay, indicated by the numeral 30, and the spaces in the bottom 17 are likewise filled with fire clay, as indicated by the numeral 31, so as to make a smooth surface as well as to prevent the excessive heat from contacting with the T bars 32 supporting the bottom tiles.

In the baking compartment and at one corner thereof I provide a firebox 33. This is constructed by providing a wall 34 of fire brick extending from the bottom plate 11 to the arch 24 of the baking compartment, said wall extending rearwardly a sufficient depth as shown in Fig. 2, and being provided with an opening 35 leading into the baking compartment. In this firebox is placed the material to be ignited for furnishing sufficient heat for the baking compartment, and after the baking compartment has been thoroughly heated, the contents of the firebox is removed and the floor of the baking compartment thoroughly swept before the articles to be baked are placed therein.

The front wall 28 is provided with an oven door 36, a fire door 37, a lamp door 38, and a door 39 beneath the fire door 37 which connects with the ash pit 40, and a door 41 leading into the heated compartment 42. On the top of the arch 24 I place a sheet of asbestos 43 and upon the top of the asbestos a layer of concrete 44. Embedded in the concrete I place a water pipe 45, the water entering into the pipe through a nipple 46 passing through the front wall, the said pipe 45 extending rearwardly then extending across the oven connecting with a similar pipe 47 extending near the front wall and then passing along the front wall, as shown by dotted lines in Fig. 5, its end connected to a nipple 48, the said nipple connected to a pipe 49 of smaller diameter, and said pipe entering into the heated compartment 42 through the front wall near the bottom, connecting a coil 50 located on the bottom of the heated compartment, this coil terminating into the outlet 47$^a$ permitting the contents to empty into any suitable receptacle for reuse. The object of this pipe connection is to supply the heated compartment with sufficient heat by means of hot water or steam, deriving its heat from the fire while heating the baking compartment. Upon the side walls 13 of the heated compartment 42 I provide a plurality of angle supports 51 in which are mounted rollers 52, and upon said rollers may be placed slides 53 upon which the material to be heated is placed. The express purpose of this heated compartment is to raise the dough after the same has been molded and formed in shapes before the material is placed into the baking compartment for baking, and the use of the slides 53 is to support the articles, and the entire contents on one slide can be inserted or removed by the baker at will.

After the oven has been constructed as described, material such as sand, indicated by the numeral 54, is placed around the concrete structure and the same is held in position by the sheets 15, the end walls 28 and 29 and the entire structure is supported in rigid position by the buck staves 55, connected at the tops by the stay rods 56.

The baking compartment is provided with a flue 57 to which is connected a chimney 58, and in said chimney is located a damper 59, a detail construction of which is shown in Fig. 9.

Having fully described my invention, what I claim is:

1. A baking oven composed of a baking compartment; a fire-box located in the baking compartment; a heated compartment located beneath the baking compartment, said compartments formed by a suitable structure supporting tiling for retaining the heat with the compartments, and a suitable material placed over, under and around the tiling for retaining the heat; and a pipe embedded in the material above the baking compartment and extending downwardly into the heated compartment for administering heat to the heated compartment, substantially as specified.

2. A baker's oven comprising a baking compartment; a fire-box located at one side of and near the front of said baking compartment; a heating compartment located beneath the baking compartment and to one side of the fire-box; a plurality of supports located on the side walls of the heating compartment; rollers supported in said supports; slides removably mounted on said rollers; a pipe located above the baking compartment and embedded in the material; a coil located in the bottom of the heating compartment and a pipe connection between the upper pipes and the coil through which the heated water or steam may pass for supplying heat to the heating compartment, substantially as specified.

PETER AHLHEIM.

Witnesses:
JOHN L. HAVLIN,
G. R. MITCHELL.